(12) United States Patent
Kozat et al.

(10) Patent No.: US 7,831,832 B2
(45) Date of Patent: *Nov. 9, 2010

(54) DIGITAL GOODS REPRESENTATION BASED UPON MATRIX INVARIANCES

(75) Inventors: S. Serdar Kozat, Urbana, IL (US); M. Kivanc Mihcak, Redmond, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1117 days.

This patent is subject to a terminal disclaimer.

(21) Appl. No.: 10/752,268

(22) Filed: Jan. 6, 2004

(65) Prior Publication Data

US 2005/0149727 A1 Jul. 7, 2005

(51) Int. Cl.
*H04L 29/06* (2006.01)
*G06F 7/04* (2006.01)
*H04N 7/167* (2006.01)

(52) U.S. Cl. ............... 713/176; 713/165; 713/167; 726/1; 726/2; 726/26; 726/30; 726/32; 380/46; 380/47; 380/201; 380/236; 380/237

(58) Field of Classification Search ............... 713/176
See application file for complete search history.

(56) References Cited

U.S. PATENT DOCUMENTS 4,773,039 A 9/1988 Zamora (Continued)

FOREIGN PATENT DOCUMENTS

CN 1279849 A 1/2001

(Continued)

OTHER PUBLICATIONS

"The Singular Value Decompostion" http://www2.imm.dtu.dk/~pch/Projekter/tsvd.htm. Aug. 20, 1999.*

(Continued)

*Primary Examiner*—Michael J Simitoski
*Assistant Examiner*—Jenise E Jackson
(74) *Attorney, Agent, or Firm*—Lee & Hayes, PLLC

(57) ABSTRACT

Described herein is an implementation that produces a new representation of a digital good (such as an image) in a new defined representation domain. In particular, the representations in this new domain are based upon matrix invariances. In some implementations, the matrix invariances may, for example, heavily use singular value decomposition (SVD).

20 Claims, 3 Drawing Sheets

U.S. PATENT DOCUMENTS

| | | | |
|---|---|---|---|
| 5,093,869 A | 3/1992 | Alves et al. | |
| 5,210,820 A | 5/1993 | Kenyon | |
| 5,351,310 A | 9/1994 | Califano et al. | |
| 5,425,081 A | 6/1995 | Gordon et al. | |
| 5,465,353 A | 11/1995 | Hull et al. | |
| 5,490,516 A * | 2/1996 | Hutson | 600/508 |
| 5,535,020 A | 7/1996 | Ulichney | |
| 5,613,004 A | 3/1997 | Cooperman et al. | |
| 5,664,016 A | 9/1997 | Preneel et al. | |
| 5,687,236 A | 11/1997 | Moskowitz et al. | |
| 5,689,639 A | 11/1997 | Schwarz | |
| 5,734,432 A | 3/1998 | Netravali et al. | |
| 5,774,588 A | 6/1998 | Li | |
| 5,802,518 A | 9/1998 | Karaev et al. | |
| 5,809,498 A | 9/1998 | Lopresti et al. | |
| 5,835,099 A * | 11/1998 | Marimont | 345/591 |
| 5,862,260 A | 1/1999 | Rhoads | |
| 5,875,264 A | 2/1999 | Carlstrom | |
| 5,899,999 A | 5/1999 | De Bonet | |
| 5,915,038 A | 6/1999 | Abdel-Mottaleb et al. | |
| 5,918,223 A | 6/1999 | Blum et al. | |
| 5,953,451 A | 9/1999 | Syeda-Mahmood | |
| 5,983,351 A | 11/1999 | Glogau | |
| 6,075,875 A * | 6/2000 | Gu | 382/107 |
| 6,081,892 A | 6/2000 | Grawrock et al. | |
| 6,101,602 A | 8/2000 | Fridrich | |
| 6,131,162 A | 10/2000 | Yoshiura et al. | |
| 6,134,343 A | 10/2000 | Nichani | |
| 6,246,777 B1 | 6/2001 | Agarwal et al. | |
| 6,249,616 B1 * | 6/2001 | Hashimoto | 382/284 |
| 6,278,385 B1 | 8/2001 | Kondo et al. | |
| 6,314,192 B1 | 11/2001 | Chen et al. | |
| 6,321,232 B1 | 11/2001 | Syeda-Mahmood | |
| 6,330,672 B1 | 12/2001 | Shur | |
| 6,363,381 B1 | 3/2002 | Lee et al. | |
| 6,363,463 B1 | 3/2002 | Mattison | |
| 6,370,272 B1 | 4/2002 | Shimizu | |
| 6,377,965 B1 | 4/2002 | Hachamovitch et al. | |
| 6,385,329 B1 | 5/2002 | Sharma et al. | |
| 6,401,084 B1 | 6/2002 | Ortega et al. | |
| 6,418,430 B1 | 7/2002 | DeFazio et al. | |
| 6,425,082 B1 | 7/2002 | Matsui et al. | |
| 6,477,276 B1 | 11/2002 | Inoue et al. | |
| 6,513,118 B1 | 1/2003 | Iwamura | |
| 6,522,767 B1 | 2/2003 | Moskowitz et al. | |
| 6,532,541 B1 * | 3/2003 | Chang et al. | 713/176 |
| 6,546,114 B1 | 4/2003 | Venkatesan et al. | |
| 6,574,348 B1 | 6/2003 | Venkatesan et al. | |
| 6,574,378 B1 * | 6/2003 | Lim | 382/305 |
| 6,584,465 B1 | 6/2003 | Zhu et al. | |
| 6,606,744 B1 | 8/2003 | Mikurak | |
| 6,625,295 B1 | 9/2003 | Wolfgang et al. | |
| 6,628,801 B2 | 9/2003 | Powell et al. | |
| 6,647,128 B1 | 11/2003 | Rhoads | |
| 6,654,740 B2 * | 11/2003 | Tokuda et al. | 707/5 |
| 6,658,423 B1 | 12/2003 | Pugh et al. | |
| 6,658,626 B1 | 12/2003 | Aiken | |
| 6,671,407 B1 | 12/2003 | Venkatesan et al. | |
| 6,674,861 B1 | 1/2004 | Xu et al. | |
| 6,687,416 B2 | 2/2004 | Wang | |
| 6,700,989 B1 | 3/2004 | Itoh et al. | |
| 6,701,014 B1 | 3/2004 | Syeda-Mahmood | |
| 6,725,372 B1 * | 4/2004 | Lewis et al. | 713/176 |
| 6,751,343 B1 | 6/2004 | Ferrell et al. | |
| 6,754,675 B2 | 6/2004 | Abdel-Mottaleb et al. | |
| 6,768,809 B2 | 7/2004 | Rhoads et al. | |
| 6,768,980 B1 | 7/2004 | Meyer et al. | |
| 6,769,061 B1 | 7/2004 | Ahern | |
| 6,771,268 B1 | 8/2004 | Crinon | |
| 6,782,361 B1 | 8/2004 | El-Maleh et al. | |
| 6,799,158 B2 | 9/2004 | Fischer et al. | |
| 6,839,673 B1 | 1/2005 | Choi et al. | |
| 6,864,897 B2 * | 3/2005 | Brand | 345/582 |
| 6,879,703 B2 * | 4/2005 | Lin et al. | 382/100 |
| 6,901,514 B1 * | 5/2005 | Iu et al. | 713/176 |
| 6,907,527 B1 * | 6/2005 | Wu | 713/176 |
| 6,965,898 B2 * | 11/2005 | Aono et al. | 707/101 |
| 6,971,013 B2 | 11/2005 | Mihcak et al. | |
| 6,973,574 B2 | 12/2005 | Mihcak et al. | |
| 6,996,273 B2 | 2/2006 | Mihcak et al. | |
| 7,007,166 B1 | 2/2006 | Moskowitz et al. | |
| 7,062,419 B2 | 6/2006 | Grzeszczuk et al. | |
| 7,095,873 B2 * | 8/2006 | Venkatesan et al. | 382/100 |
| 7,142,675 B2 | 11/2006 | Cheng et al. | |
| 7,171,339 B2 | 1/2007 | Repucci et al. | |
| 7,234,640 B2 | 6/2007 | Pentel | |
| 2001/0010333 A1 | 8/2001 | Han et al. | |
| 2002/0126872 A1 | 9/2002 | Brunk et al. | |
| 2002/0154778 A1 | 10/2002 | Mihcak et al. | |
| 2002/0172394 A1 | 11/2002 | Venkatesan et al. | |
| 2002/0196976 A1 | 12/2002 | Mihcak et al. | |
| 2003/0056101 A1 | 3/2003 | Epstein | |
| 2003/0095685 A1 | 5/2003 | Tewfik et al. | |
| 2003/0118208 A1 | 6/2003 | Epstein | |
| 2003/0133591 A1 | 7/2003 | Watanabe et al. | |
| 2003/0169269 A1 | 9/2003 | Sasaki et al. | |
| 2003/0190054 A1 | 10/2003 | Troyansky et al. | |
| 2003/0194133 A1 * | 10/2003 | Wenzel et al. | 382/209 |
| 2003/0198389 A1 * | 10/2003 | Wenzel et al. | 382/218 |
| 2003/0219144 A1 | 11/2003 | Rhoads et al. | |
| 2004/0001605 A1 | 1/2004 | Venkatesan et al. | |
| 2004/0100473 A1 | 5/2004 | Grzeszczuk et al. | |
| 2004/0125983 A1 | 7/2004 | Reed et al. | |
| 2004/0249615 A1 | 12/2004 | Grzeszczuk et al. | |
| 2005/0015205 A1 | 1/2005 | Repucci et al. | |
| 2005/0065974 A1 | 3/2005 | Mihcak et al. | |
| 2005/0071377 A1 | 3/2005 | Mihcak et al. | |
| 2005/0076229 A1 | 4/2005 | Mihcak et al. | |
| 2005/0084103 A1 | 4/2005 | Mihcak et al. | |
| 2005/0163313 A1 | 7/2005 | Maitland et al. | |
| 2005/0165690 A1 | 7/2005 | Liu et al. | |
| 2005/0180500 A1 | 8/2005 | Chiang et al. | |
| 2006/0274114 A1 | 12/2006 | Silverbrook et al. | |
| 2007/0053325 A1 | 3/2007 | Shin et al. | |
| 2008/0031524 A1 * | 2/2008 | Wenzel | 382/209 |

FOREIGN PATENT DOCUMENTS

| | | |
|---|---|---|
| EP | 0581317 | 2/1994 |
| EP | 1 253 784 | 10/2002 |
| EP | 1553780 | 7/2005 |
| JP | 7239862 | 9/1995 |
| JP | 11-041571 | 2/1999 |
| JP | 11098341 | 4/1999 |
| JP | 2000050057 | 2/2000 |
| JP | 2000115728 A | 4/2000 |
| JP | 2000149004 | 5/2000 |
| JP | 2000243067 A | 9/2000 |
| JP | 2000261655 | 9/2000 |
| JP | 2000332988 | 11/2000 |
| JP | 2000350007 | 12/2000 |
| JP | 2000-004350 | 1/2001 |
| RU | 2193825 C2 | 11/2002 |
| WO | WO 99/17537 | 4/1999 |
| WO | WO 99/18723 | 4/1999 |
| WO | WO 99/60514 | 11/1999 |
| WO | WO 01/11890 | 2/2001 |
| WO | WO 01/28230 | 4/2001 |
| WO | WO 02/37331 | 5/2002 |
| WO | WO03092197 A1 | 11/2003 |

OTHER PUBLICATIONS

Cooper and Foote, Oct. 19-22, 2003, Summarizing Popular Music Via Structural Similarity Analysis, IEEE, pp. 1-4.*

Irons and Schmucker, 2003, The Need of Perceptual Hashing Techniques for Music Scores, IEEE, pp. 1-4.*
Bebis et al., Using Algebraic Functions of Views for Indexing-Based Object Recognition, IEEE, pp. 634-639.*
Mihcak et al., "Watermarking via Optimization Algorithms for Quantizing Randomized Statistics of Image Regions" Proceedings of the Annual Allerton Conference on Communication Control and Computing Urbana IL 2002 10 pages.
Moulin et al.,"The Parallel-Gaussian Watermarking Game" IEEE Transactions Information Theory Feb. 2004 pp. 1-36.
Venkatesan et al., "Robust Image Hashing" Proceedings of the IEEE-ICIP Vancouver BC Canada 2000 3 pages.
Chang et al.,RIME: A Replicated Image Detector for the World-Wide Web Proceedings of the SPIE vol. 3527 Nov. 2-4, 1998 pp. 58-67.
Chen et al., "Quantization Index Modulation Methods for Digital Watermarking and Information Embedding of Multimedia" Journal of VLSI Signal Processing 27 2001 pp. 7-33.
Mihcak et al.,"New Iterative Geometric Methods for Robust Perceptual Image Hashing" Proceedings of the Security and Privacy Digital Rights Management Workshop 2001 9 pages.
Kesal et al.,"Iteratively Decodable Codes for Watermarking Applications" Proceedings of the Second Symposium on Turbo Codes and Their Applications France Sep. 2000 4 pages.
Venkatesan et al.,"Image Watermarking with Better Resilience" Proceedings of IEEE-ICIP Vancouver BC Canada 2000 4 pages.
Mihcak et al.,"Cryptanalysis of Discrete-Sequence Spread Spectrum Watermarks" Proceedings of the Information Hiding Workshop Holland 2002 21 pages.
Mihcak et al., "Blind Image Watermarking Via Derivation and Quantization of Robust Semi-Global Statistics" Proceedings of IEEE-ICASSP Orlando FL 2002 4 pages.
Chen et al.,"Achievable Performance of Digital Watermarking Systems" IEEE 1999 pp. 13-18.
Mihcak et al.,"A Perceptual Audio Hashing Algorithm: A Tool for Robust Audio Identification and Information Hiding" Proceedings of the Information Hiding Workshop 2001 15 pages.
Malvar, "A Modulated Complex Lapped Transform and its Applications to Audio Processing" IEEE ICASSP'99 Phoenix AZ. Mar. 1999 pp. 1-4.
Moulin et al., "A Framework for Evaluating the Data-Hiding Capacity of Image Sources" IEEE Transactions on Image Processing vol. 11 No. 9 Sep. 2002 pp. 1-14.
Wu et al., Video Access Control Via Multi-level Data Hiding Proc. IEEE Int. Conf. on Multimedia and Expo vol. I Jul./Aug. 2000 pp. 381-384.
Fridrich et al., "Robust Hash Functions for Digital Watermarking" Proc. Int. Conf. on Information Technology: Coding and Computing Mar. 2000 pp. 178-183.
Lee et al.,"Adaptive Video Watermarking Using Motion Information" Proc SPIE vol. 3971: Security and Watermarking of Multimedia Contents II Jan. 2000 pp. 209-216.
Echizen et al.,"General Quality Maintenance Module for Motion Picture Watermarking" IEEE Trans. on Consumer Electronics vol. 45 No. 4. Nov. 1999 pp. 1150-1158.
Lin et al., "A Robust Image Authentication Method Distinguishing JPEG Compression from Malicious Manipulation", IEEE Transactions, Feb. 2001, vol. 11, No. 2, pp. 153-168.
Schneider et al., "A Robust Content Based Digital Signature for Image Authentication", Proceedings, International Conference, Sep. 1996, vol. 3, pp. 227-230.
M. D. Swanson, B. Zhu and B. Chau, "Object based transparent video watermarking," Proceedings of IEEE Signal Processing Society 1997 Workshop on Multimedia Signal Processing, Jun. 23-25, 1997, Princeton, New Jersey, USA.
M. K. Mihçak and R. Venkatesan, "A tool for robust audio Information hiding: A perceptual audio hashing algorithm," submitted to Workshop on Information Hiding, Pittsburgh, PA, 2001.
T. Kalker and J. Haitsma, "Efficient detection of a spatial spread-spectrum watermark in MPEG video streams," Proc. IEEE ICIP, Vancouver, Canada, Sep. 2000.
F. A. P. Petitcolas and R. J. Anderson, "Evaluation of copyright marking systems," Proceedings of IEEE Multimedia Systems'99, vol. 1, pp. 574-579, Jun. 7-11, 1999, Florence, Italy.

I. J. Cox, J. Killian, T. Leighton, and T. Shamoon, "A secure robust watermark for multimedia," Information Hiding Workshop, University of Cambridge, pp. 185-206, 1996.
J. Dittman, M. Stabenau and R. Steinmetz, "Robust MPEG video watermarking technologies," Proceedings of ACM Multimedia '98, The 6th ACM International Multimedia Conference, Bristol, England, pp. 71-80.
B. Chen and G. W. Wornell, "Digital watermarking and information embedding using dither modulation," Proc. IEEE Workshop on Multimedia Signal Processing, Redondo Beach, CA, pp. 273-278, Dec. 1998.
Chang et al., "A Spatial Match Representation Scheme for Indexing and Querying in Iconic Image Databases", 1997, ACM, Retrieved from the Internet http://portal.acm.org/citation.cfm?id=266890&coll=ACM&dl=ACM&CFID=68519948&CFTOKEN=85922645.
El-Kwae et al., "Efficient Content-Based Indexing of Large Image Databases", Apr. 2000, ACM, Retrieved from the Internet: http://portal.acm.org/citation.cfm?id=348762&coll=ACM&dl=ACM&CFID=68519948&CFTOKEN=85922645.
Politis et al., "An Audio Signatures Indexing Scheme for Dynamic Content Multimedia Databases", Electrotechnical Conference, 2000. IEEE, vol. 2, May 29, 2000, pp. 725-728.
Lambrou et al, "Classification of Audio Signals Using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 6, pp. 3621-3624.
Moreno et al., "Using the Fisher Kemal Method for Web Audio Classification", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2417-2420.
Pye, D., "Content-Based Methods for the Management of Digital Music", Acoustics, Speech, and Signal Precessing, 2000. ICASSP '00. Proceedings. 2000 IEEE International Conference on Jun. 5-9, 2000, Piscataway, NJ, USA, IEEE, vol. 6, pp. 2437-2440.
Cheng et al. "Aircraft Identification based on the algebraic method" Hybrid Image and Signal Processing III, vol. 1702, Apr. 23, 1992, pp. 298-305.
Kozat S. S. et al., "Robust Preceptual Image Hashing Via Matrix Invariants" Image Processing, 2004. Oct. 24, 2004.
Venkatesan, et al., "Image Hashing", Microsoft Research, Mar. 24, 2000, pp. 1-8.
B. Chen and G. W. Wornell, "Quantization Index Modulation: A class of Provably Good Methods for Digital Watermarking and Information Embedding," IEEE Trans. Inform. Theory, 1999 and 2000, pp. 1-54.
B. Chen and G. W. Wornell, "Dither modulation: a new approach to digital watermarking and information embedding," Proc. of SPIE: Security and Watermarking of Multimedia Contents, vol. 3657, pp. 342-353, 1999.
Echizen, Isao et al., "General Quality Maintenance Module for Motion Picture Watermarking", IEEE Transactions on Consumer Electronics, vol. 45, No. 4, Nov. 1999, 9 pages.
Takeuchi, Kazuki et al., "Image ID Extraction by Content Analysis and its Applications", Nov. 24, 2000, 8 pages.
Muramatsu, et al., "A Sound Database System with Intuitive Retrieval Retrieved by Sound", vol. 1999, No. 1, Mar. 25-28, 1999, The Institute of Electronics, Information and Communication Engineers, 1999, pp. 4.
Tsuji, et al., "Local Patterns of a Melody and its Applications to Retrieval by Sensitivity Words", IEICE Technical Report, Mar. 6, 1997, vol. 96, No. 565, pp. 17-24.
Yoshino et al., "An Automatic Metadata Creation Method for Music Data and its Application to Semantic Associative Search", Technical Report of Information Processing Society of Japan, Jul. 9, 1998, vol. 98 No. 58, pp. 109-116.
Venkatesan, et al., "Robust Image Hashing", vol. 3, Image Processing 2000, IEEE, 2000, pp. 664-666.
Dittmann, et al., "Content-based Digital Signature for Motion Pictures Authentication and Content-Fragile Watermarking", IEEE 1999, retrieved on Jul. 27, 2008 at <<http://ieeexplore.ieee.org/iel5/

6322/16898/00778274.pdf?tp=&arnumber=778274&isnumber=16898>, pp. 209-213.

Lin, et al., "Generating Robust Digital Signature for Image/Video Authentication", retrieved on Jul. 27, 2008 at <<http://www.ee.columbia.edu/In/dvmm/publications/98/acmmm98.pdf>>, Multimedia and Security Workshop at ACM Multimedia, '98, Bristol UK, Sep. 1998.

Brin, et al., "Copy Detection Mechanisms for Digital Documents", Proceedings of the ACM SIGMOD Annual Conference, San Jose, May 1995, pp. 398-409.

"US ASCII Code Chart", 1968, Wikipedia.

Kalker, Tom, et al., "A Video Watermarking System for Broadcast Monitoring" IS&T/SPIE Conference on Securing and Watermarking of Multimedia Contents, SPIE vol. 3657, San Jose, CA, Jan. 1999.

Liu et al., "A SVD-Based Watermarking Scheme for Protecting Rightful Ownership", IEEE Transaction on Multimedia, vol. 4, Issue 1, Mar. 2002, pp. 121-128.

* cited by examiner

DIGITAL GOODS REPRESENTATION BASED UPON MATRIX INVARIANCES

TECHNICAL FIELD

This invention generally relates to a signal representation technology.

BACKGROUND

Digital goods are often distributed to consumers over private and public networks—such as Intranets and the Internet. In addition, these goods are distributed to consumers via fixed computer readable media, such as a compact disc (CD-ROM), digital versatile disc (DVD), soft magnetic diskette, or hard magnetic disk (e.g., a preloaded hard drive).

Unfortunately, it is relatively easy for a person to pirate the pristine digital content of a digital good at the expense and harm of the content owners—which includes the content author, publisher, developer, distributor, etc. The content-based industries (e.g., entertainment, music, film, software, etc.) that produce and distribute content are plagued by lost revenues due to digital piracy.

"Digital goods" is a generic label, used herein, for electronically stored or transmitted content. Examples of digital goods include images, audio clips, video, multimedia, software, and data. Depending upon the context, digital goods may also be called a "digital signal," "content signal," "digital bitstream," "media signal," "digital object," "object," "signal," and the like.

In addition, digital goods are often stored in massive databases—either structured or unstructured. As these databases grow, the need for streamlined categorization and identification of goods increases.

Hashing

Hashing techniques are employed for many purposes. Among those purposes are protecting the rights of content owners and speeding database searching/access. Hashing techniques are used in many areas such as database management, querying, cryptography, and many other fields involving large amounts of raw data.

In general, a hashing technique maps a large block of raw data into a relatively small and structured set of identifiers. These identifiers are also referred to as "hash values" or simply "hash." By introducing a specific structure and order into raw data, the hashing function drastically reduces the size of the raw data into a smaller (and typically more manageable) representation.

Limitations of Conventional Hashing

Conventional hashing techniques are used for many kinds of data. These techniques have good characteristics and are well understood. Unfortunately, digital goods with visual and/or audio content present a unique set of challenges not experienced in other digital data. This is primarily due to the unique fact that the content of such goods is subject to perceptual evaluation by human observers. Typically, perceptual evaluation is visual and/or auditory.

For example, assume that the content of two digital goods is, in fact, different, but only perceptually, insubstantially so. A human observer may consider the content of two digital goods to be similar. However, even perceptually insubstantial differences in content properties (such as color, pitch, intensity, phase) between two digital goods result in the two goods appearing substantially different in the digital domain.

Thus, when using conventional hashing functions, a slightly shifted version of a digital good generates a very different hash value as compared to that of the original digital good, even though the digital good is essentially identical (i.e., perceptually the same) to the human observer.

The human observer is rather tolerant of certain changes in digital goods. For instance, human ears are less sensitive to changes in some ranges of frequency components of an audio signal than other ranges of frequency components.

This human tolerance can be exploited for illegal or unscrupulous purposes. For example, a pirate may use advanced audio processing techniques to remove copyright notices or embedded watermarks from audio signal without perceptually altering the audio quality.

Such malicious changes to the digital goods are referred to as "attacks", and result in changes at the data domain. Unfortunately, the human observer is unable to perceive these changes, allowing the pirate to successfully distribute unauthorized copies in an unlawful manner.

Although the human observer is tolerant of such minor (i.e., imperceptible) alterations, the digital observer—in the form of a conventional hashing technique—is not tolerant. Traditional hashing techniques are of little help identifying the common content of an original digital good and a pirated copy of such good because the original and the pirated copy hash to very different hash values. This is true even though both are perceptually identical (i.e., appear to be the same to the human observer).

Applications for Hashing Techniques

There are many and varied applications for hashing techniques. Some include anti-piracy, content categorization, content recognition, watermarking, content-based key generation, and synchronization in audio or video streams.

Hashing techniques may be used to search on the Web for digital goods suspected of having been pirated. In addition, hashing techniques are used to generate keys based upon the content of a signal. These keys are used instead of or in addition to secret keys. Also, hashing functions may be used to synchronize input signals. Examples of such signals include video or multimedia signals. A hashing technique must be fast if synchronization is performed in real time.

SUMMARY

Described herein is an implementation that produces a new representation of a digital good (such as an image) in a new defined representation domain. In particular, the representations in this new domain are based upon matrix invariances. In some implementations, the matrix invariances may, for example, heavily use singular value decomposition (SVD).

DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, and thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of a Digital Goods Representation based upon Matrix Invariances that incorporate elements recited in the appended claims. These implementations are described with specificity in order to meet statutory written description, enabling, and best-mode requirements. However, the description itself is not intended to limit the scope of this patent.

These exemplary implementations, described herein, are examples. These exemplary implementations do not limit the scope of the claimed present invention; rather, the present invention might also be embodied and implemented in other ways, in conjunction with other present or future technologies.

An example of an embodiment of a Digital Goods Representation based upon Matrix Invariances may be referred to as an "exemplary goods representer."

When randomization is mentioned herein, it should be understood that the randomization is carried out by means of a pseudo-random number generator (e.g., RC4) whose seed is the secret key ($\kappa$), where this key is unknown to the adversary.

Introduction

Figure 3:
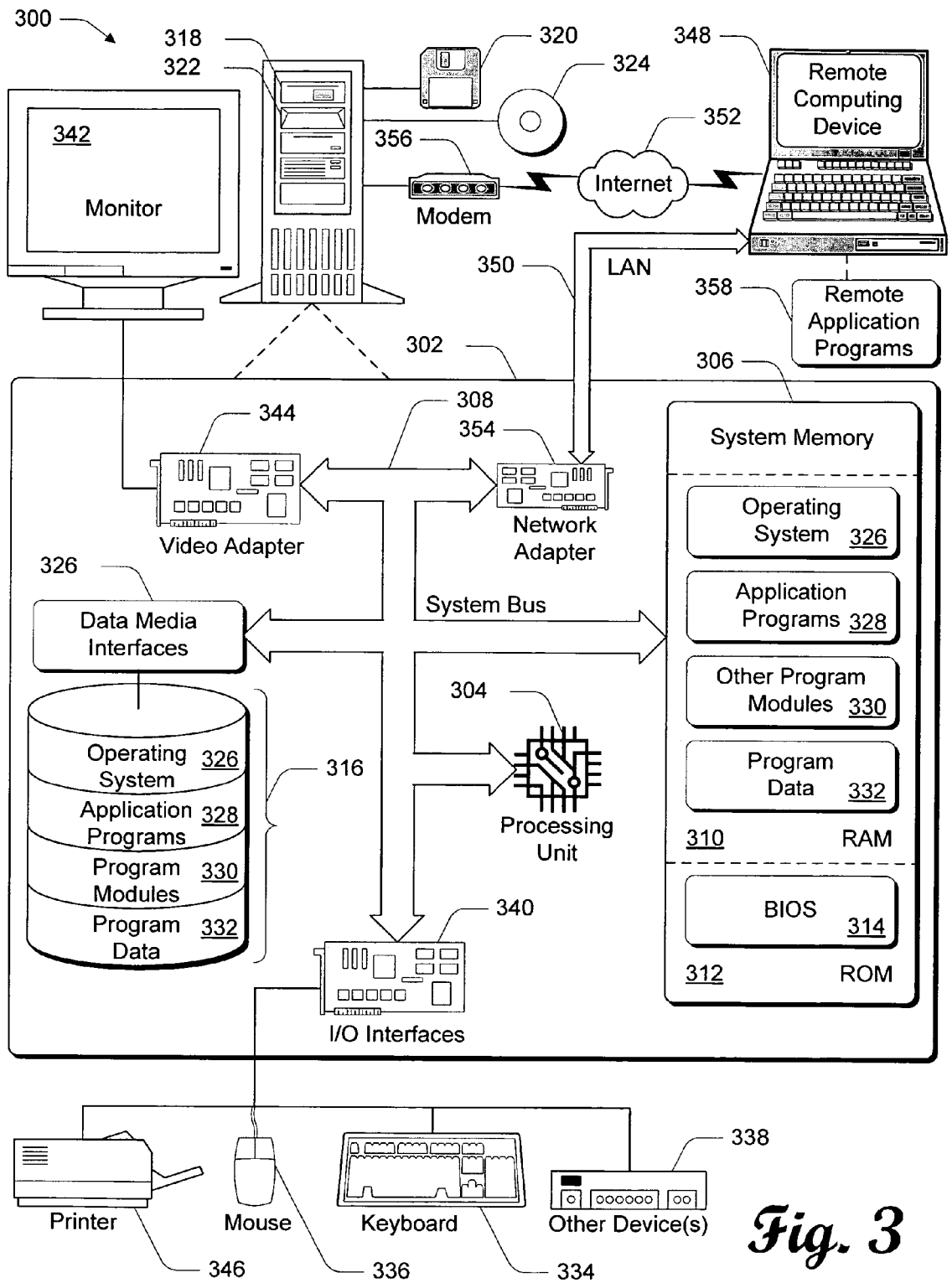
FIG. 3 is an example of a computing operating environment capable of (wholly or partially) implementing at least one embodiment described herein.

The one or more exemplary implementations of the invention, described herein, may be implemented (wholly or partially) on computing systems and computer networks like that show in FIG. 3. Although implementations may have many applications, cryptosystems, authorization, and security are examples of particular applications.

The exemplary goods representer derives robust feature vectors of digital goods from pseudo-randomly selected semi-global regions of the goods via matrix invariances. Such regions may (but need not be) overlapping.

Unlike the conventional approaches, the exemplary goods representer's calculations are based on matrix invariances (such as that based upon Singular Value Decomposition (SVD)). SVD components capture essential characteristics of digital goods.

Semi-Global Characteristics

Semi-global characteristics are representative of general characteristics of a group or collection of individual elements. As an example, they may be statistics or features of "regions" (i.e., "segments"). Semi-global characteristics are not representatives of the individual local characteristics of the individual elements; rather, they are representatives of the perceptual content of the group (e.g., segments) as a whole.

The semi-global characteristics may be determined by a mathematical or statistical representation of a group. For example, it may be an average of the color values of all pixels in a group. Consequently, such semi-global characteristics may also be called "statistical characteristics." Local characteristics do not represent robust statistical characteristics.

Notations

Herein, capital letters (e.g., A, B, C) represent matrices, lowercase letters with vector notation (e.g., ~a, ~b, ~c) represent column vectors and lowercase letters represent scalars (e.g., a, b, c). The secret key is represented with $\kappa$.

Herein, the following mathematical definitions are used:

I$\in$R$^{n \times n}$: Two-dimensional representation of digital goods of size n$\times$n.

L$_n$: Identity matrix of size n$\times$n.

A$_i\in$R$^{m \times m}$: matrix which represents the ith pseudo-random region (e.g., a rectangle of size m$\times$m) taken from the digital goods.

A$^T$: Transpose of matrix A.

|A|$_F$: The Frobenous norm of a matrix A defined as $$|A|_F = \left( \sum_{k=1}^{m} \sum_{l=1}^{m} a_{k,l}^2 \right)^{\frac{1}{2}}$$

where $a_{k,l}$ is the element of A at row k and column l.

$^{AH}$: Hermitian transpose of matrix A. Note that A$^H$=A$^T$ for real matrices.

|~v|$_2$: The L$_2$ norm of a vector which is defined as $$|\sim v|_2 = \left( \sum_k v_k^2 \right)^{\frac{1}{2}}$$

where $v_k$ is the k-th element of ~v.

D$\in$R$^{m \times m}$: size m DCT transformation matrix for 1-dimensional signals of length m. Note that 2-dimensional DCT transform of a matrix I (size m$\times$m) is given by DID$^T$.

W$\in$R$^{m \times m}$: size m DWT transformation matrix for 1-dimensional signals of length m. Note that 2-dimensional DWT transform of a matrix I (size m$\times$m) is given by WIW$^T$.

|~a|$^H$: Hamming weight of a binary vector ~a.

SVD of a matrix A$_i\in$R$^{m \times m}$ is defined as: A=U$\Sigma$V$^H$ where

U=[~u$_1$~u$_2$ ... ~u$_m$]: $\{\sim u_i\}_{i=1}^m$ are orthonormal eigenvectors of the matrix AA$^H$ (and may not be unique in general). $\{\sim u_i\}_{i=1}^m$ are termed as the left singular vectors of A.

V=[~v$_1$~v$_2$ ... v$_m$]: $\{\sim v_i\}_{i=1}^m$ are orthonormal eigenvectors of the matrix A$^H$A (and may not be unique in general). $\{\sim v_i\}_{i=1}^m$=are termed as the right singular vectors of A.

$\Sigma$: A diagonal real matrix of size m$\times$m where the i-th diagonal entry, $\sigma_i$, is termed as the i-th singular value. Without loss of generality, one may assume $\sigma_1$>= $\sigma_2$ ... >=$\sigma_m$.

Singular Value Decomposition (SVD)

The exemplary goods representer captures the essence of the geometric information while having dimensionality reduction. SVD has some provable optimality properties: "Best" lower-dimensional (say K-dimensional) approximation to a matrix (say rank N, N>=K) in the sense of Frobenius norm is produced by the first K singular vectors and the corresponding singular values.

The essence of the semi-global features and the geometric information of digital goods (such as images) are compactly captured by the significant components of the SVD of such goods. Such components are approximately invariant under intentional or unintentional disturbances as long as the digital goods of interest are not perceptively altered too severely.

With the exemplary goods representer, SVD is applied to pseudo-randomly-chosen semi-global regions of images mainly because of security reasons. SVD components obtained from these regions accurately represent the overall features of the digital goods and bear favorable robustness properties while providing reasonable security as long as we use the sufficient number and size of regions.

The conventional choices were typically DCT (discrete cosine transform) and DWT (discrete wavelet transform). With DCT or DWT, the digital goods are projected onto a fixed set of fixed basis vectors. DCT/DWT have proven to be generally effective for conventional goods processing applications.

Instead of the DCT/DWT-type fixed basis transforms, the exemplary goods representer employs Singular Value Decomposition (SVD). With SVD, the exemplary goods representer selects the optimal basis vectors in $L_2$ norm sense (see Equation (1) below). Furthermore, given a matrix, its SVD is unique. As an analogy, if a digital good is represented as a vector in some high-dimensional vector space, then the singular vectors give the optimal direction information to the good in the sense of Equation (1) while the singular values give the distance information along this direction. Consequently, the singular vectors that correspond to large singular vectors are naturally prone to any scaling attack and other small conventional signal-processing modifications.

By using SVD decomposition, the digital goods may be considered as a two dimensional surface in a three dimensional space. When DCT-like transformations are applied to a digital good (or surface), the information about any particularly distinctive (hence important) geometric feature of the digital good is dispersed to all coefficients.

As an example, an image may have a surface with strong peaks (e.g., very bright patches in a dark background) which will be dispersed to all transformations in case of DCT. By using SVD, the exemplary goods representer preserves both the magnitude of these important features (in singular values) and also their location and geometry in the singular vectors. Hence, the combination of the top left and right singular vectors (i.e. the ones that correspond to the largest singular values) captures the important geometric features in an image in $L_2$ norm sense.

Properties of SVD

The following describes the mathematically properties of SVD. Let $A=U\Sigma V^H$ be the SVD of A. Then, 1) The left singular vectors $U=[\sim u_1 \sim u_2 \ldots \sim u_m]$: $\{\sim u_i\}_{i=1}^m$ are an orthonormal basis for the column space of A.

2) The right singular vectors $V=[\sim v_1 \sim v_2 \ldots \sim v_m]$: $\{\sim v_i\}_{i=1}^m$, are an orthonormal basis for the row space of A.

3) We have $$(\sigma_1, \sim u_1, \sim v_1) = \arg\min_{a, \sim x, \sim y} |A - a \sim x \sim y^H|_F^2,$$

where $|\sim x|_2 = |\sim y|_2 = 1$ and $\forall k; 1 < k <= m$ $$(\sigma_k, \sim u_k, \sim v_k) = \arg\min_{a, \sim x, \sim y} \left| A - \sum_{l=1}^{k-1} \sigma_l \sim u_l \sim v_l^H - a \sim x \sim y^H \right|_F^2, \quad (1)$$

where $\sigma_1 >= \sigma_2 \ldots >= \sigma_m$ are the singular values, $\{\sim u_i\}$ and $\{\sim v_i\}$ are the corresponding singular vectors.

Hashing

A hash function employed by the exemplary goods representer has two inputs, a digital good (such as an image) I and a secret key κ. This hash function produces a short vector $\sim h = H_\kappa(I)$ from a set $\{0, 1\}^h$ with $2^h$ cardinality. It is desirable for the perceptual hash to be equal for all perceptual-similar digital goods with high probability. It is also desirable for two perceptually different digital goods to produce unrelated hash values with high probability. Such a hash function is a many-to-one mapping. On the other hand, for most applications it may be enough to have sufficiently similar (respectively different) hash values for perceptually similar (respectively different) inputs with high probability, i.e., the hash function may show a graceful change.

The requirements for such a hash function are given as:

1) Randomization: For any given input, its hash value should be approximately uniformly distributed among all possible outputs. The probability measure is defined by the secret key.

2) Pairwise Independence: The hash outputs for two perceptually different digital goods should be independent with high probability, where the probability space is defined by the secret key.

3) Invariance: For all possible acceptable disturbances, the output of the hash function should remain approximately invariant with high probability, where the probability space is defined by the secret key.

Two digital goods are deemed to be perceptually similar when there are no reasonably noticeable distortions between them in terms of human perception.

Methodological Implementations of the Exemplary Goods Representer

Figure 1:
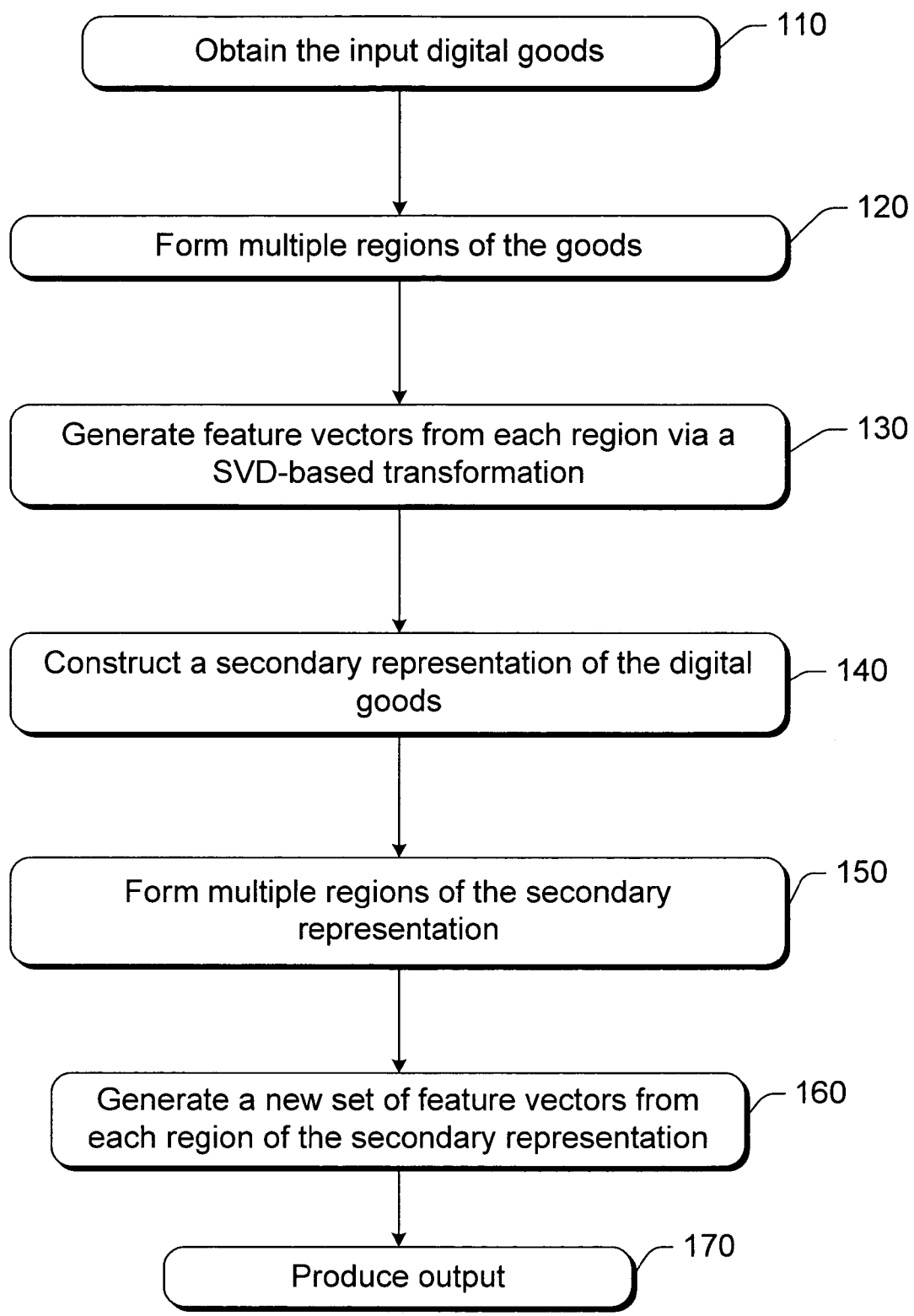
FIG. 1 is a flow diagram showing a methodological implementation described herein.

FIG. 1 shows a methodological implementation of the exemplary goods representer. This methodological implementation may be performed in software, hardware, or a combination thereof.

At 110, the exemplary goods representer obtains input digital goods. For this explanation, the input digital goods will be an image of size n×n, which may be described as $I \in R^{n \times n}$. Note that, the image may also be rectangular (i.e., the sizes may be different). This approach can be generalized to this condition with no difficulty.

At 120, the exemplary goods representer pseudo-randomly forms multiple regions from I. The number of regions may be called p and the shape of the regions may be, for example, rectangles. The shape of the regions may differ from implementation to implementation.

Although they do not necessarily need to, these regions may overlap each other. However, one may produce an implementation that requires such overlap. Conversely, one may produce an implementation that does not allow overlap.

This action, represented by: $A_i \in R^{m \times m}$, $1 <= i <= p$. $A_i$ is a matrix which represents the ith pseudo-random region (e.g., a rectangle of size m×m) taken from the digital goods. Note that, each of these regions can be a matrix of different sizes and this can be easily used in this approach with no difficulty.

At 130, it generates feature vectors (each of which may be labeled $\sim g_i$) from each region $A_i$ via a SVD-based transformation. This feature-vector generation may be generically described as $\sim g_i = T_1(A_i)$.

These feature vectors ($\sim g_i$) may be used as hash values after suitable quantization or they can be used as intermediate features from which actual hash values may be produced. The SVD-based transformation ($T_1(A_i)$) is a hash function that employs SVD. Examples of hash functions are described below in the section titled "SVD-based Hash Functions."

At this point, the exemplary goods representer has produced a representation (the collection of feature vectors produced by $\sim g_i = T_1(A_i)$) of the digital goods. Some implementations may end here with a combination of $\{\sim g_1, \ldots, \sim g_p\}$ to form the hash vector.

In these implementations, $T_1(\bullet)$ may be designed so that $T_1(A_i)$ yields the top q singular values from the rectangle $A_i$. Another possibility would be to design $T_1(\bullet)$ such that $T_1(A_i)$ yields the top q singular vectors (left, right or both). These are the q singular vectors that correspond to the largest q values. Naturally, in both cases, the parameter q should be chosen properly; for instance, a logical decision would require q<<m.

In some implementations, it would be possible to choose p=1 and $A_i$ such that it corresponds to the whole image. Note that this variant does not possess any randomness; hence, it is more suitable for non-adversarial applications of image hashing.

Alternatively, other implementations may perform additional processing to produce even smoother results. Blocks 140, 150, 160, and 170 show that.

At 140, the exemplary goods representer constructs a secondary representation J of the digital goods by using a pseudo-random combination of feature vectors $\{\sim g_1, \ldots, \sim g_p\}$. At this point, these vectors produced as part of block 130 may be considered "intermediate" feature vectors.

As part of such construction of the secondary representation J, the exemplary goods representer collects the first left and right singular vectors that correspond to the largest singular value from each subsection.

Let $\Gamma = \{\sim u_1, \ldots, \sim u_p, \sim v_1, \ldots, \sim v_p\}$ where (respectively $\sim v_i$) is the first left (respectively right) singular vector of the i-th subsection. Then, the exemplary goods representer pseudo-randomly forms a smooth representation J from the set $\Gamma$: Given a pseudo-randomly selected initial singular vector, we proceed to form J by selecting and replacing subsequent vectors from $\Gamma$ such that the next chosen vector is closest to the previous vector in $L_2$ norm sense.

Hence, after 2p steps all the elements of $\Gamma$ are pseudo-randomly re-ordered and J (of size m×2p) is formed. Note that, the $L_2$ metric can be replaced by any other suitable metric (possibly randomized) in the formation of J so that continuity and smoothness are achieved. The smooth nature of J may be desirable in some implementations.

Also note that, instead of this simple pseudo-random re-ordering of vectors, it is possible to apply other (possibly more complex) operations to generate J.

At 150, the exemplary goods representer pseudo-randomly forms multiple regions from J. The number of regions may be called r and the shape of the regions may be, for example, rectangles. The shape of the regions may differ from implementation to implementation. Like the above-described regions, these regions may be any shape and may overlap (but are not required to do so).

This action is represented by this: $B_i \in R^{d \times d}$, $1 \leq i \leq r$. $B_i$ is a matrix which represents the ith pseudo-random region (e.g., a rectangle of size d×d) taken from the secondary representation J of the digital goods. Note that, in this implementation, the rectangles may have different sizes. In other implementations, the rectangles may be the same size.

At 160, it generates a new set of feature vectors (each of which may be labeled $\sim f_i$) from each region $B_i$ via a SVD-based transformation. This feature-vector generation may be generically described as $\sim f_i = T_2(B_i)$.

These feature vectors ($\sim f_i$) are hash values. The SVD-based transformation ($T_2(B_i)$) is a hash function that employs SVD. Examples of hash functions are described below in the section titled "SVD-based Hash Functions." These two SVD-based transformations ($T_1$ and $T_2$) may be the same as or different from each other.

At 170, the exemplary goods representer combines the feature vectors of this new set $\{\sim f_1, \ldots, \sim f_p\}$ to form the new hash vector, which produces an output that includes the combination of vectors.

SVD-Based Hash Functions

This section discusses several hashing functions that may be employed by the SVD-based transformations ($T_1$ and $T_2$) introduced above in the description of FIG. 1.

SVD-SVD Hash Functions

Given an image, for example, the exemplary goods representer pseudo-randomly selects p subimages $A_i \in R^{m \times m}$, $1 \leq i \leq p$. Then the exemplary goods representer finds the SVD of each sub-image:

$$A_i = U_i S_i V_i^T,$$

where $U_i$, $V_i$ are the m×m real left and right singular vector matrices respectively and $S_i$ is the real m×m diagonal matrix consisting of the singular values along the diagonal.

After forming the secondary representation at block 140, the exemplary goods representer reapplies the SVD to subsections of Bi's. As the hash vector, the exemplary goods representer keeps the corresponding set of the first r left and right singular vectors from each $B_i$ after suitable quantization.

DCT-SVD

As a variant of the SVD-SVD approach, the exemplary goods representer uses 2D-DCT transform as the initial transformation ($T_1$) in the block 130. After finding 2D-DCT of each sub-image Ai, $$D_i = DA_i D^T,$$

only the top—band of frequencies from the coefficient matrix $D_i$ is preserved. Here, D denotes the DCT transform matrix. The selection of $f_{min}$ and $f_{max}$, determines the selected frequency band. The coefficients of low-to-mid band frequencies are more descriptive and distinctive for images. Selecting $f_{min}$>0 avoids near DC frequencies, which are more sensitive to simple scaling or DC level changes. Selecting a small value of $f_{max}$ avoids using coefficients of higher frequencies, which can be altered by small noise addition, smoothing, compression, etc. Hence, depending on the problem specifications, suitable values of $f_{min}$ and $f_{max}$ can be chosen.

The coefficients in this frequency band are then stored as a vector $\sim d_i \in R^{f_{max}*f_{max}-f_{min}*f_{min}}$ for each region $A_i$. The ordering of the elements of $\{d_i\}$ is user-dependent and can possibly be used to introduce extra randomness. Then, a secondary representation is formed, following along the same lines, by choosing random vectors from the set $\Gamma = \{\sim d_1, \ldots, \sim d_p\}$, and pseudo-randomly forming a smooth representation J. Next, the exemplary goods representer applies SVD to J:

$$J = USV^T,$$

and stores the first left and right singular vectors $\sim u_1$ and $\sim v_1$ as the hash vectors.

DWT-SVD

This is a variant of the DCT-SVD approach where the 2D-DCT is replaced with 2D-DWT. After getting random rectangles $A_i$'s from the image, 1-level of DWT is applied to each $A_i$. The DC subbands are stored as vectors $\tilde{d}_i \in R^{m^2/2^l}$ to form the secondary representation J in the next stage. Next, we apply SVD to J:

$$J = USV^T$$

The first left and right singular vectors $\tilde{u}_1$ and $\tilde{v}_1$ corresponding to the largest singular value are stored as the hash vectors after suitable quantization.

Binary SVD

Instead of working on the original domain, the exemplary goods representer forms a binary representation from the original image, preserving significant regions of the digital goods. If the goods are an image, this approach might threshold the image pixels, where the threshold level is chosen, such that only t percent of image pixels are represented as ones (or zeros). Alternatively, the threshold level can be chosen such that, in each subimage, only t percent of image pixels are ones (or zeros).

Given image I, a binary image, after thresholding, may be represented as $I_b$ and first left and right binary singular vectors may be defined to correspond to the largest singular value as $$(\sim u_{b1}, v_{b1}) = \arg\min_{\sim x, \sim y} |I_b \oplus \sim x \sim y^T|_H$$

where $\sim x$ and $\sim y$ binary vectors and $\oplus$ is the binary xor operation. The other singular vectors may be found alternatively, such that the (k+1)-th singular vector pairs are derived from $$I_b \oplus \sum_{l=1}^{k} \sim u_{bl} \sim v_{bl}^T, k > 1$$

and $\oplus$ is for summation.

Hence, after thresholding, the first binary singular vectors for each binary subimage is found and forms the set $\Gamma = \{\sim u_{b1}, \ldots, \sim u_{bp}, \sim v_{b1}, \ldots, \sim v_{bp}\}$. After forming the secondary binary representation $J_b$ in the second stage, the exemplary goods representer proceeds by using the binary SVD on the r pseudo-randomly chosen regions. The final hash value is given by $\sim h = \{\sim u_{j1}, \ldots, \sim u_{jr}, \sim v_{j1}, \ldots, \sim v_{jr}\}$.

Direct SVD $T_1$ may be used as the identity transform and use the subsections directly. This idea is readily applicable to binary digital goods (such as a binary image $I_b$) which can be formed after thresholding. From each subsection $A_i$ of size m×m, form vectors $\tilde{d}_i \in R^{m^2}$ directly from the samples of the goods. The secondary representation J is generated directly from $\Gamma = \{\sim d_1, \ldots, \sim d_p\}$. Next, the exemplary goods representer applies SVD to J:

$$J = USV^T$$

and stores the first left and right singular vectors $\sim u_1$ and $\sim v_1$ as the hash vectors.

Exemplary System for Generating Representation of Digital Goods

Figure 2:
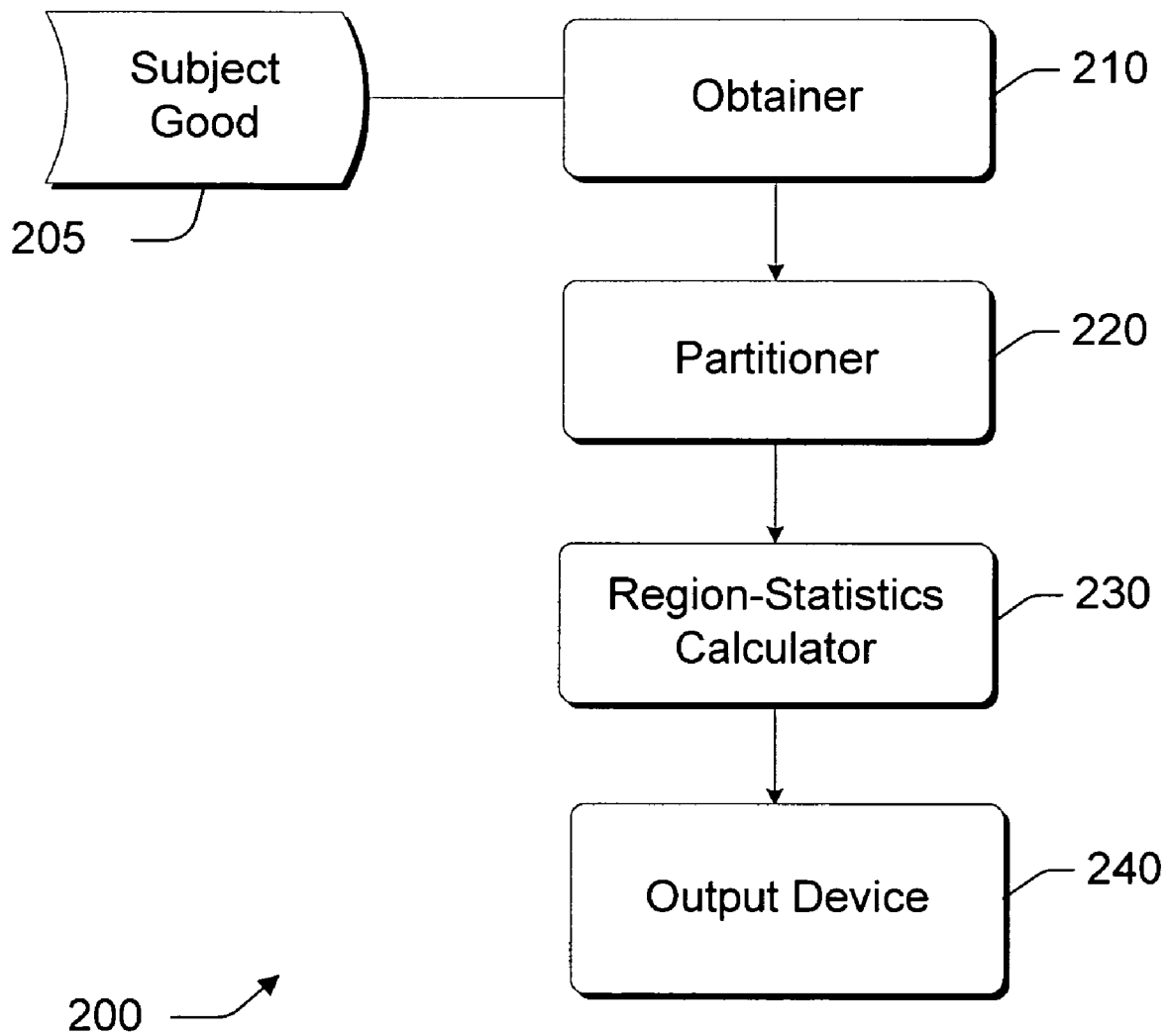
FIG. 2 is a block diagram of an implementation described herein.

FIG. 2 shows an exemplary system 200 for generating representation of digital goods, which is an example of an embodiment of the exemplary goods representer.

The system 200 generates a representation (e.g., a hash value) of a digital good. In this example, digital good is an image. The system 200 includes a goods obtainer 210, a partitioner 220, a region-statistics calculator 230, and an output device 240.

The goods obtainer 210 obtains a digital good 205 (such as an audio signal or a digital image). It may obtain the goods from nearly any source, such as a storage device or over a network communications link. In addition to obtaining, the goods obtainer 410 may also normalize the amplitude of the goods. In that case, it may also be called an amplitude normalizer.

The partitioner 220 separates the goods into multiple, pseudo-randomly sized, pseudo-randomly positioned regions (i.e., partitions). Such regions may overlap (but such overlap is not necessary).

For example, if the good is an image, it might be partitioned into two-dimensional polygons (e.g., regions) of pseudo-random size and location. In another example, if the good is an audio signal, a two-dimensional representation (using frequency and time) of the audio clip might be separated into two-dimensional polygons (e.g., triangles) of pseudo-random size and location.

In this implementation, the regions may indeed overlap with each other.

For each region, the region-statistics calculator 230 calculates statistics of the multiple regions generated by the partitioner 220. Statistics for each region are calculated. The statistics calculated by the calculator 230 may be the feature vectors described above in the description of blocks 130 and 160.

The output device 240 may present the results (for each region or combined) of the region-statistics calculator 230. Such results may be stored or used for further calculations.

Examples of Applications for Exemplary Goods Representer

The exemplary goods representer would be useful for various applications. Such applications would include adversarial and non-adversarial scenarios.

Some non-adversarial applications would include search problems in signal databases, signal monitoring in non-adversarial media. In non-adversarial applications, applying our approach on the whole image would produce favorable results. Yet another application of our algorithm would be several certification applications: In order to compactly describe distinguishing features (face pictures, iris pictures, fingerprints, etc.) of human beings, an application could use their hash values, where the hash values are produced via the exemplary goods representer.

Exemplary Computing System and Environment

FIG. 3 illustrates an example of a suitable computing environment 300 within which an exemplary goods representer, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any one or combination of components illustrated in the exemplary computing environment 300.

The exemplary goods representer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary goods representer may be described in the general context of processor-executable instructions, such as program modules, being executed by a computer. Generally, program modules include routines, programs, objects, components, data structures, etc. that perform particular tasks or implement particular abstract data types. The exemplary goods representer may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 302 may include, but are not limited to, one or more processors or processing units 304, a system memory 306, and a system bus 308 that couples various system components, including the processor 304, to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 302 typically includes a variety of processor-readable media. Such media may be any available media that is accessible by computer 302 and includes both volatile and non-volatile media, removable and non-removable media.

The system memory 306 includes processor-readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 may be connected to the system bus 308 by one or more interfaces (not shown).

The disk drives and their associated processor-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 316 magnetic disk 320, optical disk 324, ROM 312, and/or RAM 310, including by way of example, an operating system 326, one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components, such as speakers (not shown) and a printer 346, which may be connected to computer 302 via the input/output interfaces 340.

Computer 302 may operate in a networked environment using logical connections to one or more remote computers, such as a remote computing device 348. By way of example, the remote computing device 348 may be a personal computer, portable computer, a server, a router, a network computer, a peer device or other common network node, and the like. The remote computing device 348 is illustrated as a portable computer that may include many or all of the elements and features described herein, relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet. Such networking environments may be wired or wireless.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components, such as the operating system, are illustrated herein as discrete blocks, although it is recognized that such programs and components reside at various times in different storage components of the computing device 302, and are executed by the data processor(s) of the computer.

Processor-Executable Instructions

An implementation of an exemplary goods representer may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 300 in which an exemplary goods representer may be implemented. Specifically, the exemplary goods representer(s) described herein may be implemented (wholly or in part) by any program modules 328-330 and/or operating system 326 in FIG. 3 or a portion thereof.

The operating environment is only an example of a suitable operating environment and is not intended to suggest any limitation as to the scope or use of functionality of the exemplary goods representer(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Processor-Readable Media

An implementation of an exemplary goods representer may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, communication media may comprise, but is not limited to, wired media such as a wired network or direct-wired connection, and wireless media such as acoustic, RF, infrared, and other wireless media. Combinations of any of the above are also included within the scope of processor-readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for producing a new representation of a digital good in a new defined representation domain, the new defined representation domain based upon matrix invariances, the method comprising:

obtaining a digital goods;

selecting, by a partitioner in a computing device, a plurality of pseudo-randomly sized and pseudo-randomly positioned regions from the digital goods;

extracting robust features from the plurality of pseudo-randomly sized and pseudo-randomly positioned regions, wherein the features are based upon singular value decomposition (SVD), discrete cosine transform, or discrete wavelet transform and further wherein the features are within the new defined representation domain;

producing a first output comprising the calculated statistics of one or more of the plurality of pseudo-randomly sized and pseudo-randomly positioned regions, wherein the statistics of the one or more of the plurality of pseudo-randomly sized and pseudo-randomly positioned regions are representatives of respective one or more of the plurality of pseudo-randomly sized and pseudo-randomly positioned regions and are calculated based upon matrix invariances;

constructing a secondary representation of the digital goods by using a pseudo-random combination of the calculated statistics;

forming multiple second regions from the secondary representation;

generating a new set of feature vectors from each second region via a SVD transformation; and producing a second output.

2. A method as recited in claim 1, wherein the digital goods is selected from a group consisting of a digital image, a digital audio clip, a digital video, a database, and a software image.

3. A non-transitory method as recited in claim 1, wherein at least some of the plurality of pseudo-randomly sized and pseudo-randomly positioned regions overlap.

4. A method as recited in claim 1, wherein the plurality of pseudo-randomly sized and pseudo-randomly positioned regions are not allowed to overlap with one another.

5. A system comprising:

a processor;

one or more memories having stored therein processor-executable modules, the modules comprising:

an obtainer configured to obtain a digital goods;

a partitioner configured to pseudo-randomly partition the digital goods into a plurality of regions based at least upon a secret key;

a calculator configured to calculate singular vectors for one or more of the plurality of regions via singular value decompositions, wherein the singular vectors remain invariant with high probability for disturbances to the digital goods in a probability space defined by the secret key.

6. A system as recited in claim 5, wherein at least some of the plurality of regions overlap.

7. A system as recited in claim 5, wherein the digital goods is selected from a group consisting of a digital image, a digital audio clip, a digital video, a database, and a software image.

8. A system as recited in claim 5, wherein the plurality of regions comprise a plurality of pseudo-sized and pseudo-positioned regions.

9. A non-transitory computer storage medium having processor-executable instructions that, when executed by a processor, performs a method comprising: obtaining a digital goods; pseudo-randomly partitioning the digital goods into a plurality of regions; generating singular vectors for one or more of the plurality of regions via singular value decompositions, wherein the singular vectors remain invariant with high probability for disturbances to the digital goods.

10. A non-transitory medium as recited in claim 9, wherein the method further comprises extracting robust pseudo-random features of the digital goods, wherein the features are within a defined representation domain.

11. A non-transitory medium as recited in claim 9, wherein the digital goods is selected from a group consisting of a digital image, a digital audio clip, a digital video, a database, and a software image.

12. A computing device comprising: an audio/visual output, which is configured to produce output that is audio, visual, or both; a non-transitory medium as recited in claim 1.

13. A non-transitory computer storage medium having processor-executable instructions that, when executed by a processor, performs a method facilitating protection of digital goods, the method comprising: obtaining a digital goods; partitioning the digital goods into a plurality of pseudo-randomly sized and pseudo-randomly positioned regions, after the partitioning the digital goods, calculating statistics of one or more of the plurality of pseudo-randomly sized and pseudo-randomly positioned regions, wherein the statistics of the one or more of the plurality of pseudo-randomly sized and pseudo-randomly positioned regions are representatives of respective one or more of the plurality of pseudo-randomly sized and pseudo-randomly positioned regions and are calculated based upon matrix invariances; producing output comprising the calculated statistics of the one or more of the plurality of pseudo-randomly sized and pseudo-randomly positioned regions.

14. A non-transitory medium as recited in claim 13, wherein at least some of the plurality of pseudo-randomly sized and pseudo-randomly positioned regions overlap.

15. A non-transitory medium as recited in claim 13, wherein the matrix invariances include singular value decomposition (SVD).

16. A non-transitory medium as recited in claim 13, wherein the digital goods is selected from a group consisting of a digital image, a digital audio clip, a digital video, a database, and a software image.

17. A non-transitory medium as recited in claim 1, wherein pseudo-randomly selecting a plurality of regions comprises selecting a plurality of pseudo-randomly sized and pseudo-randomly positioned regions.

18. A non-transitory medium as recited in claim 1, wherein at least some of the plurality of regions overlap.

19. A non-transitory medium as recited in claim 1, wherein the plurality of regions are not allowed to overlap with one another.

20. A non-transitory medium as recited in claim 13, wherein prior to the partitioning, the method further comprises normalizing amplitudes of the digital goods.

* * * * *